Patented July 26, 1949

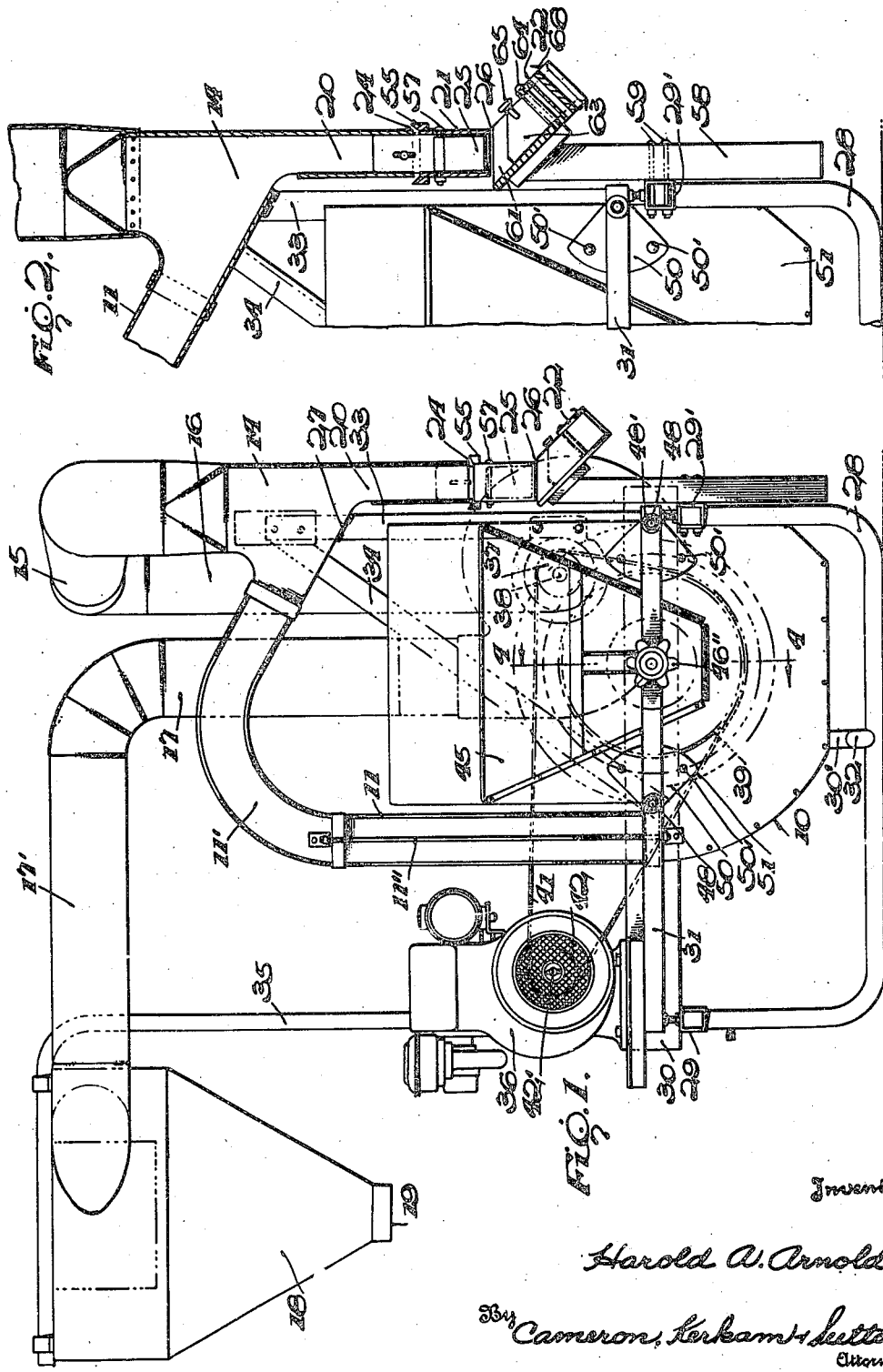

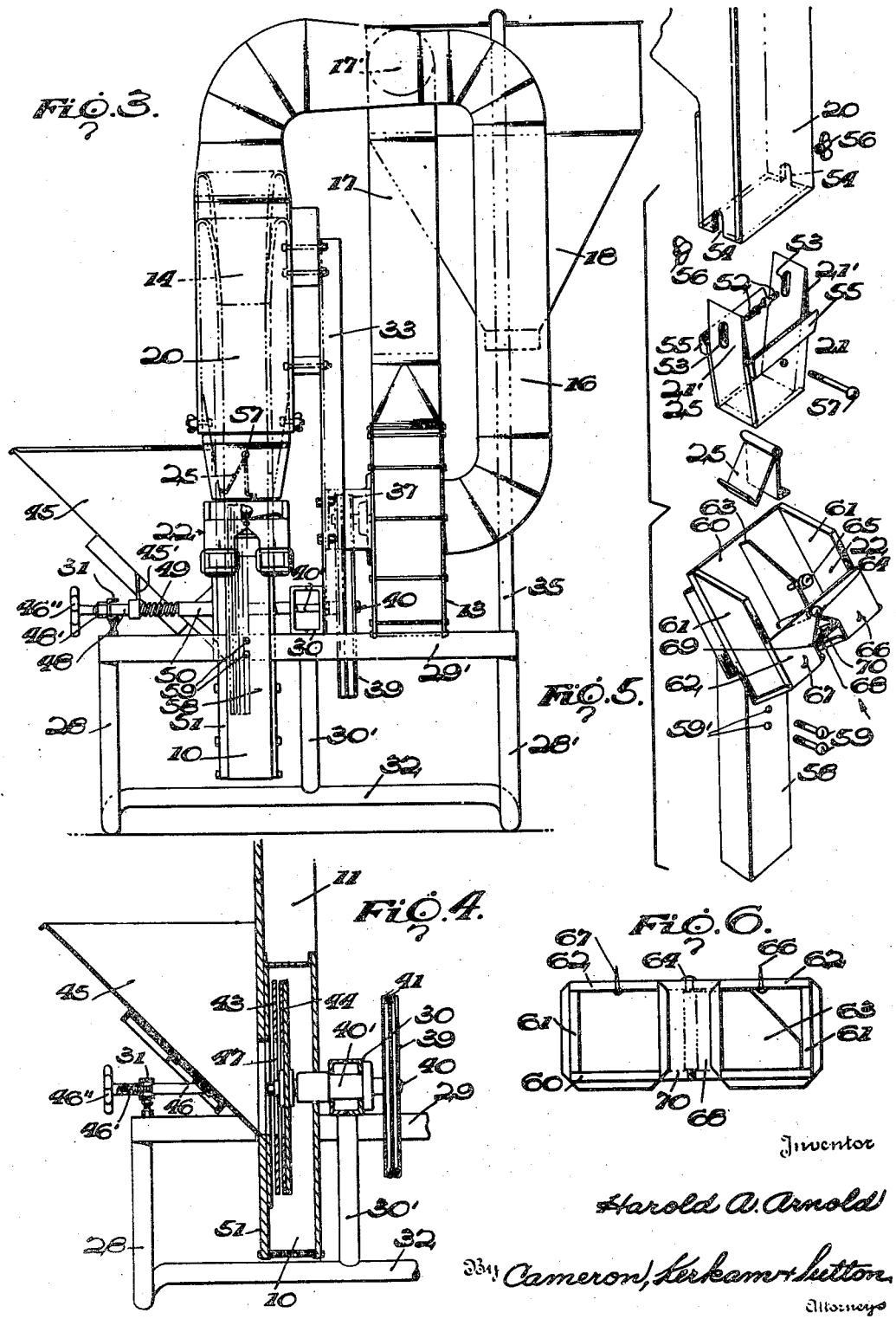

2,477,160

UNITED STATES PATENT OFFICE 2,477,160

AIR SEPARATOR FOR GRANULAR MATERIAL

Harold A. Arnold, Knoxville, Tenn., assignor to The University of Tennessee Research Corporation, Knoxville, Tenn., a corporation of Tennessee Application July 13, 1944, Serial No. 544,706

3 Claims. (Cl. 209—139)

1

The present invention relates to methods and machines for separating light and heavier particles or seed or particles of different size if they have the same density, and more particularly is a method and a machine for separating the kernels and shells of cracked nuts, discharging the shells and chaff in one path and the kernels in another path, and cleaning the kernels in their downward passage to a bagger.

The present method and machine while of general application in the separation and discharge of light and heavier particles is of particular advantage in connection with the separation of the kernels and shells of cracked nuts or beans such as castor beans.

The invention involves a simple and efficient continuous method of separation of the particles as well as a simple portable machine having a minimum of moving parts.

The invention will be better understood by reference to the accompanying drawings illustrating one mechanical embodiment of the inventive idea for performing the novel method, and wherein Fig. 1 is a side elevation of the machine;

Fig. 2 is an enlarged elevation partly in section corresponding to Fig. 1;

Fig. 3 is an end elevation looking from the right in Fig. 1;

Fig. 4 is a detail view showing one form of cracking mechanism with associated hopper and drive;

Fig. 5 is a detail pulled-out view showing the air restrictor valve housing at the bottom of the cleaning chamber or section and associated bagger mechanism;

Fig. 6 is a detail of the bagger looking in the direction of the arrow in Fig. 5;

Figure 7:
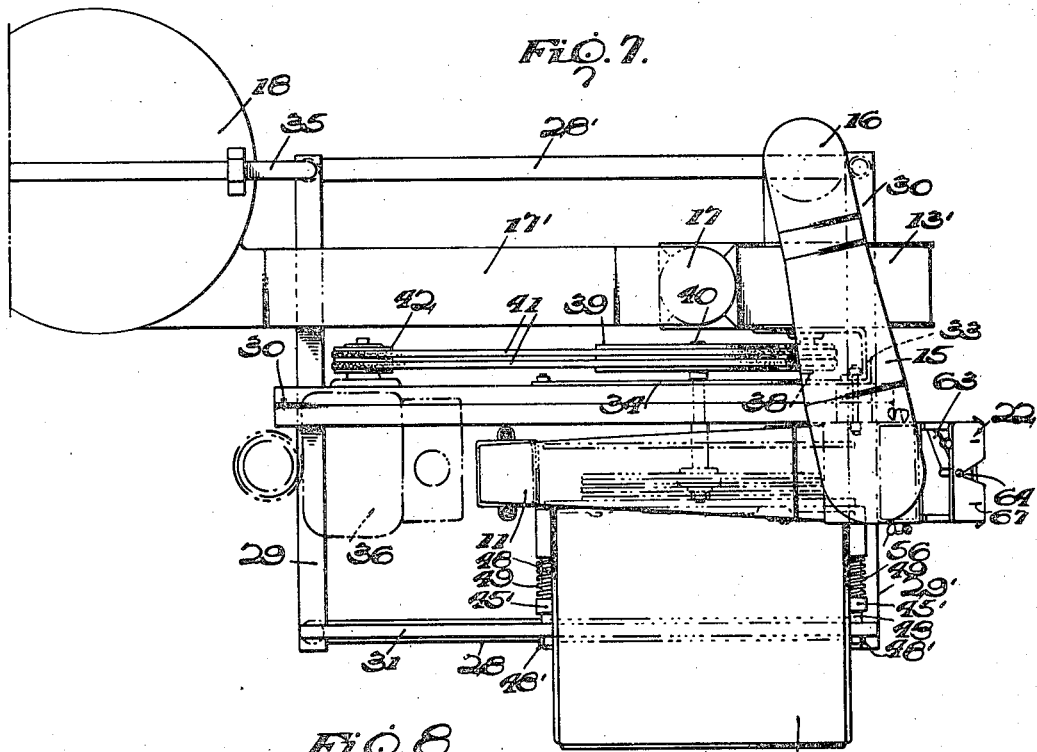
Fig. 7 is a plan view of the machine as shown in Figs. 1 and 3.
Figure 8:
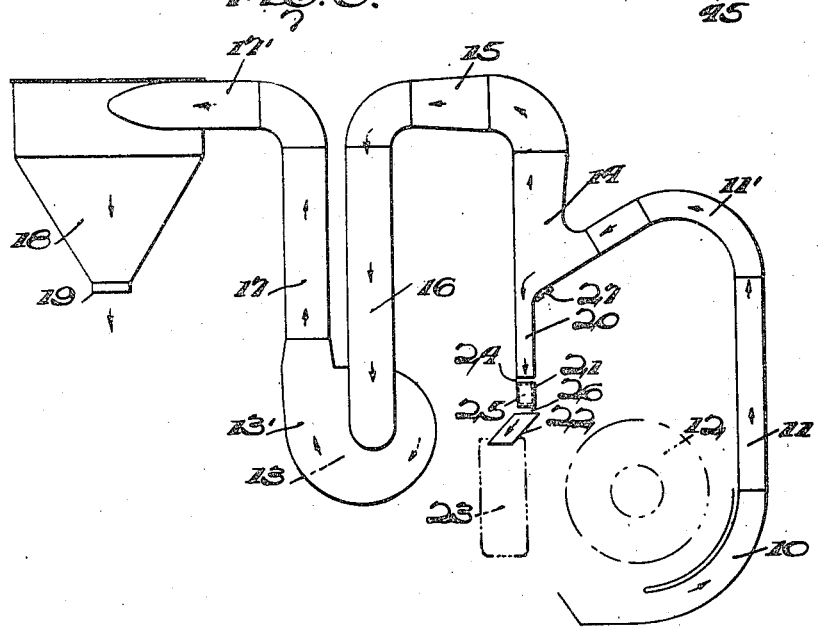
Fig. 8 is a diagrammatic view of the cracking, separating and cleaning system.

Referring first to the diagram of Fig. 8 the reference numeral 10 indicates the intake of an elevator chamber or section 11, 11', the part 11 being held fixedly in position between the housing 10 and section 11' by a rod 11'' (Fig. 1) connected to the housing 10 and section 11'. As shown this intake is a sheller housing which encloses the shelling mechanism indicated at 12 and which mechanism may be of any desired or suitable construction. This mechanism operates to shell the castor or other beans or nuts, the kernels and shells falling into the sheller housing 10.

The elevator chamber or section 11, 11' is part

2 of a closed system in which the desired air movement is secured by a suction fan 13 located in a fan housing 13' which is suitably positioned at any desired point with respect to the system and which operates on the mass of kernels and shells in the sheller housing 10 to elevate the same through the elevator chamber or section 11, 11' to a separating chamber or section 14. This chamber 14 is of an enlarged cross sectional area with respect to the elevator chamber or section 11, 11' and accordingly of correspondingly reduced suction effect. The suction effect of the fan 13 in the elevator chamber or section 11, 11' preferably provides an air velocity between 3,000–3,800 feet per minute when the kernels and shells of castor beans are being treated and between 2,000–2,800 feet per minute in the separating chamber or section 14. Under these conditions light beans, shells and chaff are separated from the heavier kernels in the chamber 14 and are further elevated and carried off from chamber 14 through pipes 15 and 16, fan 13, and thence through pipes 17, 17' to a collector 18, here shown as a collector of the cyclone type from which the light beans, shells and chaff are preferably discharged by gravity at the exit 19.

The heavier kernels are not carried over from the separating chamber 14 to the collector 18 but are separated by centrifugal force and gravity and fall through the separating chamber 14, the communicating cleaning chamber or section 20, a valve housing 21, bagger 22 and thence into receptacle 23 in which the nuts are continuously deposited. At the lower end of the cleaning chamber or section 20 is provided an adjustable air inlet 24 through which passes, under the influence of fan 13, an upward current of air which acts to clean the kernels as they fall through the chamber or section 20 by removing undesired particles therefrom. The size of this air inlet 24 depends on the adjustment of the valve housing 21 with respect to the cleaning chamber or section 20, and should be as small as possible to clean the falling kernels without permitting light beans and shells to fall with the kernels and not large enough to cause sound kernels to be carried over with the shells and chaff. An air velocity of 2,000–2,800 feet per minute has given satisfactory results in cleaning the falling kernels of sound castor beans in the cleaning chamber or section 20. The lower end of housing 21 is open and a valve 25, here shown as an inverted V-shaped flapper valve of limited movement, is arranged therein for controlling the upward passage of air entering at 26 between the bagger 22 and housing 21, and which air passes through housing 21 and into the cleaning chamber or section 20.

The arrows on Fig. 8 indicate the path of the mass of kernels and shells upwardly from the sheller housing 10 through the elevator chamber or section 11, 11' to the separating chamber or section 14, the separation in this chamber or section of the shells and chaff on the one hand and the kernels on the other, the passage of the shells and chaff through pipes 15 and 16, fan 13 and pipes 17, 17' to the collector 18; and also the downward gravity passage of the kernels from the separating chamber or section 14, through cleaning chamber or section 20, and through the restrictor valve housing 21 and bagger 22 into the receptacle or bag 23.

The separating chamber or section 14 with its cross sectional area enlarged over that of the elevator chamber or section 11, 11' effectively reduces therein, as heretofore noted, the suction effect of the fan 13 so that it will carry off the shells and chaff but permit the kernels to fall through the cleaning chamber 20; and this chamber or section 14 is proportioned so as not to require any adjustment under ordinary conditions.

It will be noted that the portion 11' of the elevator chamber or section is curved and as here shown substantially semi-circular in shape and that its cross section gradually increases where it joins the separating chamber or section 14. Due to the high air velocity and friction of the wall of the elevating chamber or section 11 some particles or seed entering the semi-circular section 11' have a lower velocity than others, especially the heavier ones with a lower coefficient of air resistance per unit of weight. The gradually increasing size of the cross sectional area of the semi-circular chamber 11' where it joins the chamber 14 reduces the velocity of the air and lighter particles more than that of the downwardly moving heavier particles; and the velocity of the air is comparatively uniform at the end of the semi-circular chamber or section 11' where it enters the separating chamber 14. Further the semi-circular chamber or section 11' directs the air and material downwardly into the separating chamber 14 where the direction of the air current suddenly turns upward. Thus the heavier particles, due to gravity and centrifugal force, are separated out of the air current and dropped down into the cleaner for direct action by the upwardly moving air current. The curved, substantially semi-circular portion 11' of the elevating chamber is tapered to secure uniformity in velocity and to direct the seed or material downwardly into an upwardly moving air stream for cleaning.

In the separation of the kernels and shells of castor beans a fan speed of 1,900 R. P. M. has given highly satisfactory results. It is pointed out that too slow a fan speed will not effectively elevate the sound kernels in the elevator chamber or section 11, 11', and too high a speed will carry the sound kernels with the shells into and through the chamber or section 14 to the collector 18. If the elevation of the kernels and shells through chamber or section 11, 11' into the chamber or section 14 is good but the shells and light seed are not removed through pipe 15 even with proper adjustment at 24, a further adjustable air inlet may be provided at 27 in the lower part of the separating chamber or section 14 adjacent the cleaning chamber or section 20 to provide additional air velocity to carry off the shells and light seed. Making the cross section of the upper separating chamber or section 14 smaller by placing wood blocks (1" x 10" x 12") on one side thereof is equally effective without requiring an increase in fan speed.

The air velocities heretofore given apply to the treatment of castor beans. For separating and cleaning other materials or seed appropriate and different velocities will be used. For example, the hulled seed of *Lespedeza serica* is "bean shape" about $\frac{1}{16}$ inch long and weighs around seventy pounds per measured bushel as compared with forty-six pounds per bushel for the larger castor beans. An air velocity of 2,000 feet per minute in the elevating chamber of section 11' was ample to elevate the small but heavy seed while castor beans, because of their greater size, required air velocities of over 3,000 feet per minute although they weigh much less per bushel. Separating and cleaning velocities of 1,000 to 1,400 feet per minute were used on the *Lespedeza serica*. This is explained by the fact that the air resistance of small objects decreases as the size decreases, but the resistance per square inch increases with decreases in the size of area exposed to the air current.

A preferred commercial form of my improved device (Figs. 1–7) for performing the novel method of separation embodies a base provided with skids or gliders 28, 28' to facilitate moving the device and loading it on pick-up trucks. These skids are connected by cross members 29, 29' which carry longitudinally extending channel irons 30 and 31. Supporting the channel iron 30 intermediate its ends is an upright 30' which is welded to a cross member 32 which in turn is welded to skids 28, 28'. On this base is secured a standard 33 provided with a brace 34 the upper end of this standard being connected to the separating chamber or section 14. An upright 35 on which the collector 18 is suspended is rigidly secured to the cross member 29. This standard 33 and upright 35 effectively support the whole closed pipe system on said base.

The cracking mechanism 12 and fan 13 may be driven by any suitable engine or motor. As here shown, an engine 36 is mounted on the base and drives a pulley 37 on the fan shaft 38, and a pulley 39 on the sheller shaft 40 which latter is mounted in a bearing 40' on channel iron 30 (Figs. 3 and 4). Belts 41 are driven from a pulley 42 on engine shaft 42' and pass around and drive pulleys 37 and 39 which are preferably grooved to receive the same.

My system if used for the separation of the kernels and shells of cracked nuts may be associated with various forms of shelling mechanisms. As herein shown the shelling or cracking mechanism employs a pair of disks 43, 44, the former being stationary and the latter rotating with shaft 40. With this device the shell is readily removed from the kernel by pressing on the ends of the shell, the spacing between the disks being adjusted to be less than the length of the kernel in the shell but greater than the length of the shelled kernel, so that as the beans are fed between the disks the rotating disk turns or spins the beans on more than one axis simultaneously until the beans come lengthwise between the disks when the kernel or seed is removed from the shell by pressure on the ends of the shell.

The hopper 45 for the beans or nuts is movable transversely of the machine and in such movement adjusts the stationary disk 43 with respect to the rotary disk 44. This movement of the hopper 45 and disk 43 may be effected through a rod 46 (Fig. 4) having a screw-threaded end 46' that passes through channel iron 31 and engages in a screw-threaded portion of the knob 46" that bears against channel iron 31. An opening 47 in the stationary disk 43 allows the beans or nuts to flow against the face of the rotary disk 44 and between the two disks, whereupon the kernels and shells of the cracked beans fall into the sheller housing 10 at the intake of the elevator chamber or section 11. This sheller housing 10 is mounted on rods 48 positioned with respect to channel iron 31 by nuts 48'. Each rod 48 carries a spring 49 interposed between the sheller housing 10 and hopper 45. As here shown the springs abut, on the one hand, a member 50 secured at 50' in any desired manner to the face 51 of the sheller housing 10 and, on the other hand, an abutment 45' projecting from the hopper 45. The relative position of the disks 43 and 44 is thus effected by moving hopper 45 and disk 43 with respect to disk 44; and the disk 43 may by reason of the interposition of springs 49 move or back away laterally with respect to disk 44, thus preventing injury to the disks or other parts should an undesired or foreign substance enter between the disks.

The fan 13 may be positioned at any suitable location in the closed system between the separating chamber or section 14 and the outlet 19, and specifically is located at the discharge end of the downwardly projecting pipe 16 which is connected to one side of the fan housing 13' (Fig. 3), to which fan housing is also connected the lower end of the upwardly projecting pipe 17 that discharges the shells and chaff through pipe section 17' into the collector 18. As heretofore noted, this collector is preferably of the well known cyclone type from which the shells and chaff fall by gravity through the discharge 19. The shelling dust from the castor bean is poisonous and the apparatus as a whole may be installed inside a closed chamber or room with the collector 18 on the outside. In such an installation the air movement in the system could be effected by forcing fresh air into the chamber or room.

In the separation of the kernels and shells of castor beans, as heretofore indicated, the air velocity in the elevator chamber or section 11, 11' is preferably about 3,400 feet per minute and, by reason of the enlarged cross sectional area in the separating chamber or section 14, this velocity is there reduced to about 2,000 feet per minute, which is sufficient to carry off the light beans, shells and chaff but which permits the kernels to fall through the separating chamber or section 14, the cleaning chamber or section 20, valve housing, bagger 22 and thence into the bag 23.

With particular reference to Figs. 1, 2, 3 and 5, it will be noted that the upper end of the housing 21 projects into the lower end of the cleaning chamber or section 20 and is adjustable therein by means of bolts 52 passing through slots 53 in the walls of said housing and through slots 54 in the lower end of cleaning chamber or section 20. This housing 21 carries beveled members 55 and when they have been moved to the desired position to restrict the opening 24 the valve housing is fixed in the adjusted position by tightening wing nuts 56. The end walls 21' of the housing 21 are tapered to avoid obstruction to the falling kernels. The inverted V-shaped flapper valve 25 in housing 21 is pivoted on a bolt 57 on which it has limited movement, and this valve as heretofore noted restricts the upward flow of air entering the casing 21 at 26 above the bagger 22.

The bagger 22 is preferably mounted on a standard 58 which is suitably secured to the base of the machine, as by bolts 59 passing through openings 59', and as here shown the bottom of the bagger is in the form of an inclined chute having a base plate 60, side walls 61 and a face plate 62. This bagger carries a deflector 63 which is pivoted at 64 and is movable by a handle 65 to guide the kernels either to the right or left so that they will enter a receptacle suspended on pin 66 or a receptacle suspended on pin 67. The desired deflection of the kernels below the pivot 64 is insured by an arched metallic member 68 (Fig. 5) which is braced in an opening 69 in the front plate 62 and in a similar opening in the base plate 60 by means of a wedge 70.

The operation of the device is facilitated by proper coordination of fan speed, air velocities in the elevating chamber or section 11, 11' and reduced air velocity in the separating chamber or section 14 and cleaning chamber or section 20, adjustment of the air inlet at 24, and if necessary at 27 in the separating chamber or section, restricting the cross section of the upper separating chamber or section 14, and the proper restriction by the flapper valve 25 of the air entering the system at 26 between the bagger 22 and valve housing 21. The figures heretofore given are for the treatment of castor beans; and in the handling, separation and cleaning of these the described method and machine have been eminently successful.

The present invention has numerous advantages in that it involves a continuous and economical method and apparatus for performing the separation of the kernels and shells and cleaning of the kernels; the mechanism provides a closed suction system and accordingly operators are shielded from the injurious effects of dust; the machine is simple in construction, adjustment and operation and, aside from the power unit and the bean shelling or cracking mechanism, the only rotating part is the fan shaft 38 and the only other moving part is the air-restricting flapper valve 25 the movement of which is limited; the machine is light in weight and, being mounted on skids or gliders, is readily moved and loaded on and unloaded from pick-up trucks; the closed pipe system may be of metal, plywood or other material; and by continuously elevating the kernels and shells, separating the same, delivering the shells and chaff to a collector, and cleaning the kernels prior to automatic bagging there is provided an operation of the "flash" type which is speedy, simple, economical and effective. Further, while the desired forced or suction air movement in the system may be effected in various ways it is noteworthy that it may be effected by the use of a single fan in or associated with the system, though a plurality may be employed if desired. In addition the device will not only remove light seed or particles but smaller and heavier particles, seed, or inert material due to a higher coefficient of air resistance per unit weight, and it will separate material according to the size of particles if they have the same density.

While I have described and illustrated one embodiment of my invention, it is to be understood that the inventive idea is not limited thereto but is susceptible of various embodiments within the limits of the appended claims.

What is claimed is:

1. An apparatus for separating light and heavier particles comprising a closed system including a fan for drawing air through said system, an elevating conduit in said system of constant diameter into which said particles are initially introduced, a second conduit of gradually increasing diameter communicating with said elevating conduit and extending downwardly therefrom, a separating chamber of larger diameter than the extremity of said second conduit disposed substantially vertically to said conduit and through which is drawn an upwardly moving current of air, means for regulated admission of atmospheric air into said separating chamber below the junction of said second conduit and said separating chamber, the elements being so related that the velocity of the air stream is reduced to a point at which heavier particles are released from the air stream and fall by gravity out of said separating chamber and the lighter particles remain entrained in the air stream.

2. An apparatus for separating light and heavier particles comprising a closed system including means for drawing air through said system, a passage in said system of constant cross section into which the mixed particles are initially introduced, a second passage of gradually increasing cross section communicating with said passage and extending downwardly therefrom for a substantial distance, a separating chamber of larger diameter than said seecond passage communicating therewith and extending substantially vertically therefrom and through which is drawn an upwardly moving current of air, means for regulating the admission of atmospheric air into said separating chamber, the elements being so proportioned that the velocity of the air stream at the separating chamber is reduced to a point at which heavier particles are released therefrom by gravity and the lighter particles remain entrained in the air stream.

3. An apparatus for separating light and heavier particles comprising a closed system including means for drawing air through said system, a section in said system of constant diameter into which the particles are initially introduced, a second section of gradually increasing diameter communicating therewith and extending downwardly therefrom for a substantial distance, a separating chamber of greater cross section than said section communicating therewith and extending substantially vertically therefrom and having an air outlet at its upper end, the parts being so related that the velocity of the air stream in said separating chamber is reduced to the point at which heavier particles are released from the air stream and fall by gravity out of said separating chamber and the lighter particles remain entrained in the air stream.

HAROLD A. ARNOLD.

REFERENCES CITED

The following references are of record in the file of this patent:

UNITED STATES PATENTS

| Number | Name | Date |
|---|---|---|
| 15,630 | Ward | Aug. 26, 1850 |
| 36,980 | Irvin | Nov. 18, 1862 |
| 840,724 | Sweet | Jan. 8, 1907 |
| 1,484,208 | Davis | Feb. 19, 1924 |
| 1,873,395 | Hallam | Aug. 23, 1932 |
| 1,930,684 | Kramer | Oct. 17, 1933 |
| 2,221,385 | Rogers | Nov. 12, 1940 |
| 2,298,497 | Meyer | Oct. 13, 1942 |
| 2,381,954 | Hardinge | Aug. 14, 1945 |